United States Patent
Sillmon

(10) Patent No.: US 6,325,390 B1
(45) Date of Patent: Dec. 4, 2001

(54) VACUUM FLANGE O-RING CENTER RING

(75) Inventor: Roger S. Sillmon, Troutville, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/907,662

(22) Filed: Aug. 8, 1997

(51) Int. Cl.$^7$ .............................. F16L 17/00; F16L 17/06
(52) U.S. Cl. ..................... 277/614; 277/616; 285/379
(58) Field of Search ................... 277/609, 614, 277/616, 626, 637, 603; 285/379, 263, 264, 265, 266, 267

(56) References Cited

U.S. PATENT DOCUMENTS

| | | | |
|---|---|---|---|
| Re. 27,389 | * 6/1972 | Tillman | 277/607 X |
| 3,339,948 | * 9/1967 | Weitzel | 277/608 X |
| 3,501,158 | * 3/1970 | Tillman | 277/626 X |
| 3,747,963 | 7/1973 | Shivak . | |
| 3,749,426 | * 7/1973 | Tillman | 277/607 X |
| 4,153,281 | * 5/1979 | Ahlstone | 277/609 X |
| 4,281,841 | 8/1981 | Kim et al. . | |
| 4,361,331 | * 11/1982 | Kohler | 277/609 X |
| 4,418,918 | 12/1983 | Nicoll . | |
| 4,452,462 | * 6/1984 | Karr | 277/626 X |
| 4,474,381 | * 10/1984 | Wilkins et al. | 277/626 X |
| 4,477,092 | 10/1984 | Bush . | |
| 4,537,406 | * 8/1985 | Hirasuna et al. | 277/626 X |
| 4,563,025 | * 1/1986 | Poe | 277/626 X |
| 4,779,903 | 10/1988 | Maier et al. . | |
| 4,854,597 | 8/1989 | Leigh . | |
| 5,159,814 | * 11/1992 | Jakobsson | 277/467 X |
| 5,266,192 | * 11/1993 | Ligon et al. | 210/198.2 |
| 5,340,170 | 8/1994 | Shinohara et al. . | |
| 5,368,314 | 11/1994 | Victor et al. . | |
| 5,406,830 | 4/1995 | Borden et al. . | |
| 5,435,574 | 7/1995 | Victor et al. . | |
| 5,516,122 | 5/1996 | Caffee . | |
| 5,564,177 | 10/1996 | Fernandes et al. . | |
| 5,773,841 | * 6/1998 | Aqui | 250/573 |

OTHER PUBLICATIONS

QF Hardware—Catalog pp. 6–1 and 6–3, by Kurt J. Lesker Company.

* cited by examiner

*Primary Examiner*—Anthony Knight
*Assistant Examiner*—Vishal Patel

(57) ABSTRACT

A fixture for centering and holding an elastomeric O-ring in position between vacuum sealing flanges during assembly and use thereof, having an annular body defining an outer surface and O-ring holding flange disposed on the outer surface for holding an elastomeric O-ring. The outer surface of the annular body defines a pair of beveled surfaces which enable the fixture to be inserted between the vacuum sealing flanges during assembly thereof without any substantial binding. The annular body of the fixture also defines a cylindrical inner surface having a diameter which is substantially identical to the diameter of the cylindrical inner surfaces of the sealing flanges to substantially prevent turbulent gas flow effects.

5 Claims, 4 Drawing Sheets

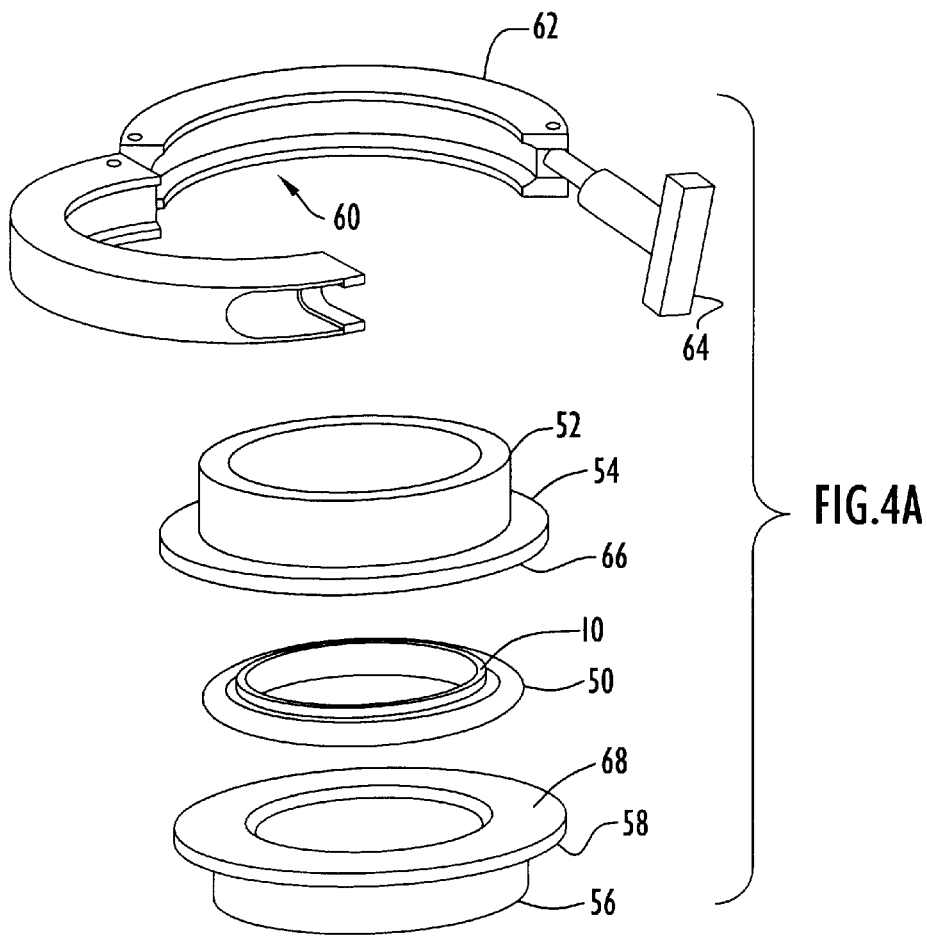
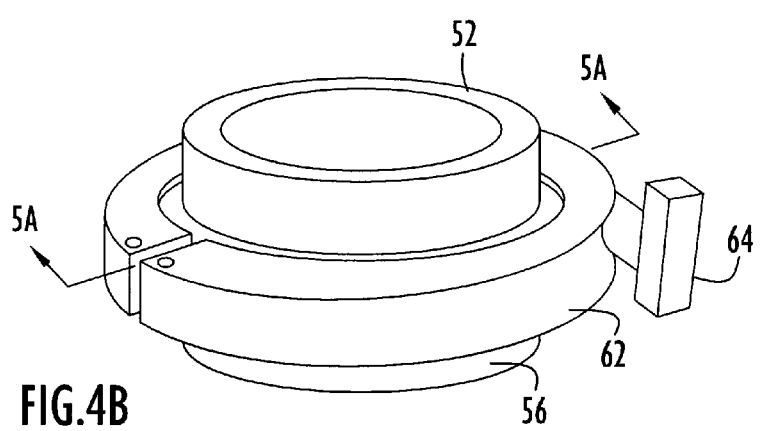

VACUUM FLANGE O-RING CENTER RING

FIELD OF THE INVENTION

The present invention relates generally to sealing arrangements for vacuum flanged tubing connections and like components and more particularly to an O-ring positioning and holding fixture for ISO-NW type vacuum flanged tubing or components.

BACKGROUND OF THE INVENTION

Prior art vacuum flange O-ring centering rings are typically constructed from aluminum or stainless steel, and are designed to hold an elastomeric O-ring in position during the assembly and use of ISO-NW vacuum sealing flanges for tubing connections. Such centering rings only function to hold the O-ring in position for sealing to the flat sealing surfaces of the flanges and to prevent the O-ring from moving inward when gas pressure inside the tubing is lower than the gas pressure outside the tubing.

Two major shortcomings are associated with prior art centering ring designs. The shortcoming has to do with the diameter of the inner surface of the centering ring not matching the diameter of the inner surface of typical vacuum tubing and like components with ISO-NW vacuum flange connections. This shortcoming produces a stepped inner surface at the tubing (or component) connection. The stepped inner surface produces a turbulent gas flow effect, known as sudden expansion and/or sudden contraction (Vena contracta). The viscous flow of gases through this type of tubing connection will have turbulent flow with eddy current flow and total gas flow losses. This shortcoming can cause gas phase reactions, condensation, and premature clogging in some types of machinery gas piping.

The other shortcoming associated with prior art centering ring designs has to do with their "straight edge" outer surface design. The outer annular side surface of present centering rings are perpendicular to the annular face surfaces of the ring. This produces a 90 degree ring shoulder which mates with the counter bore area of the sealing flange. The 90 degree ring shoulder of prior art centering ring designs require the sealing surfaces of the sealing flanges to be aligned nearly parallel with each other when assembling the centering ring and the vacuum tubing, to prevent binding.

Accordingly, a need exists for an improved vacuum flange O-ring centering ring that substantially eliminates the turbulent gas flow and binding problems of prior art vacuum flange O-ring centering ring designs.

SUMMARY

A fixture for centering and holding an elastomeric O-ring in position between vacuum sealing flanges during assembly and use thereof, comprising an annular body defining an outer surface and O-ring holding means disposed on the outer surface for holding an elastomeric O-ring. The outer surface of the annular body defines a beveled surface portion which enables the fixture to be inserted between the vacuum sealing flanges during assembly thereof without any substantial binding.

One aspect of the invention involves the beveled surface portion tapering inwardly from the O-ring holding means, wherein the beveled surface portion tapers inwardly at an angle of approximately 10 degrees as measured from a reference line which is perpendicular to the O-ring holding means.

Another aspect of the invention involves a second beveled surface portion defined on the outer surface of the fixture. The second beveled surface portion tapers inwardly from a second side of the O-ring holding means at an angle of approximately 10 degrees as measured from as measured from a reference line which is perpendicular to each of the sides of the O-ring holding means.

In still another aspect of the invention, the annular body defines a cylindrical inner surface and each of the sealing flanges defines a cylindrical inner surface of a predetermined diameter, the inner surface of the annular body having a diameter which is substantially identical to the predetermined diameter to substantially prevent turbulent gas flow effects.

BRIEF DESCRIPTION OF THE DRAWINGS

For the purpose of illustrating the present invention, reference should be made to the following drawings wherein:

FIG. 4A is an exploded perspective view depicting an exemplary application of the O-ring centering ring of the present invention to a vacuum tubing assembly;

FIG. 4B is a perspective view of the vacuum tubing assembly of FIG. 4A fully assembled;

DETAILED DESCRIPTION OF THE INVENTION

Figure 1:
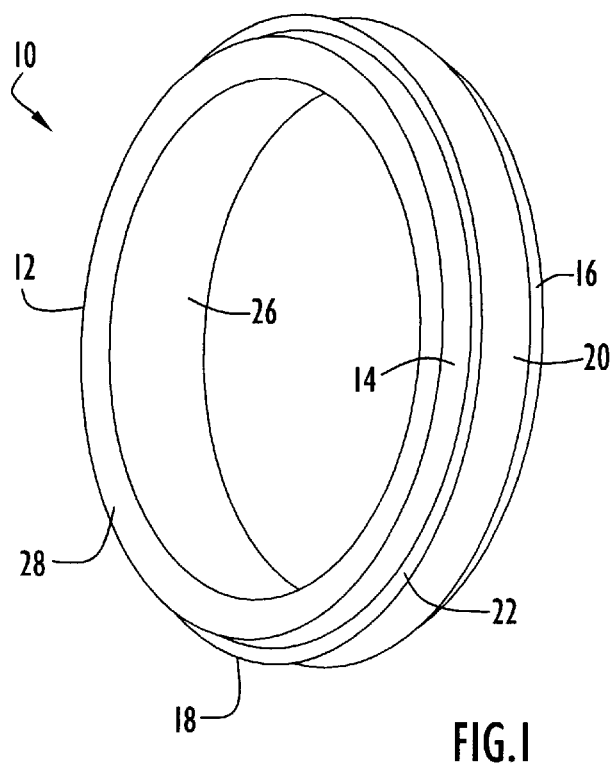
FIG. 1 is a perspective view of a vacuum flange O-ring centering ring according to an exemplary embodiment of the present invention.
Figure 2:
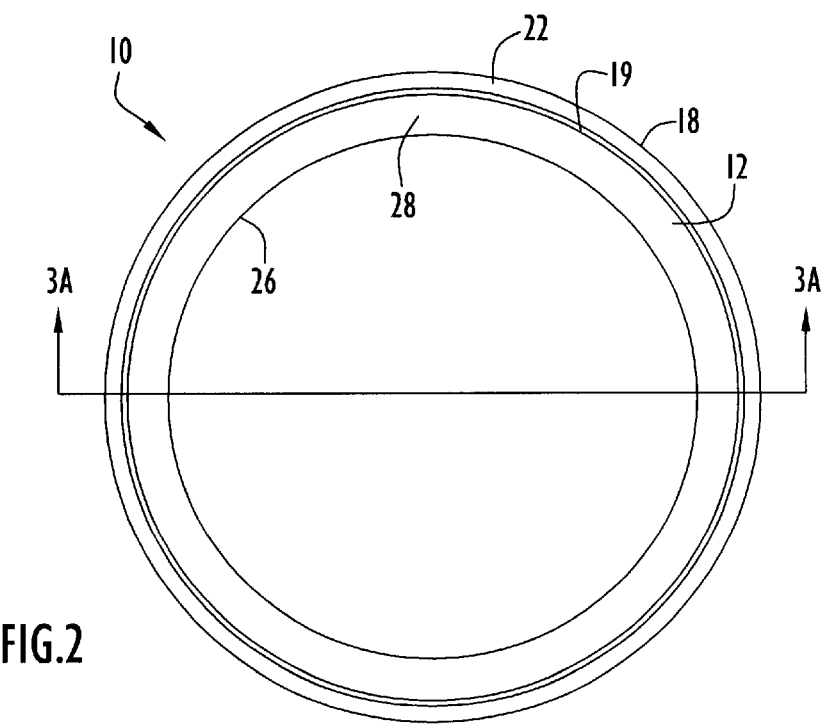
FIG. 2 is top view of the O-ring centering ring of FIG. 1.
Figure 3A:
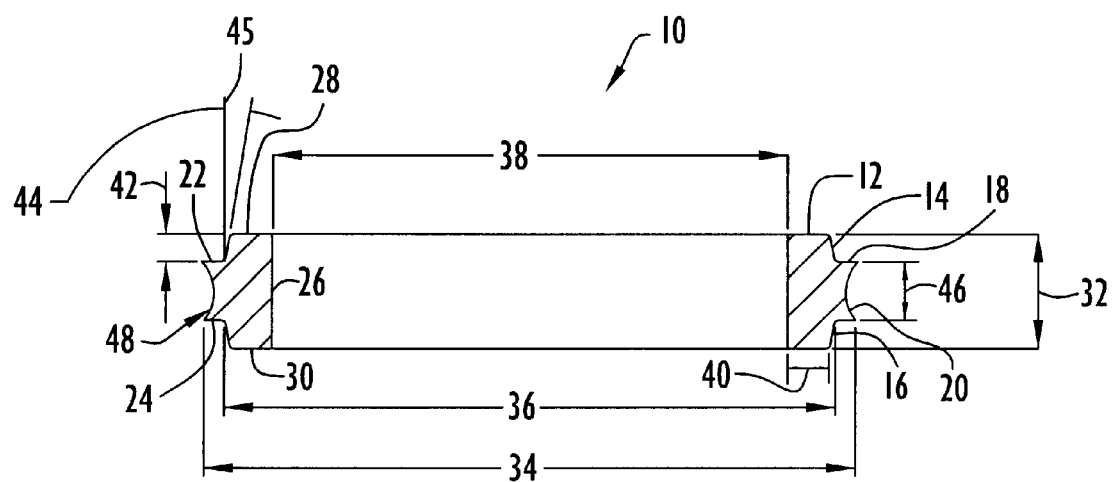
FIG. 3A is a cross-sectional side view through line 3A—3A of the O-ring centering ring of FIG. 2.

Referring collectively to FIGS. 1, 2, and 3A, a vacuum flange O-ring centering ring according to an exemplary embodiment of the present invention is shown and identified generally by the numeral 10. The O-ring centering ring 10 comprises an annular body 12 having an inner cylindrical surface 26 and first and second beveled circumferential outer surfaces 14, 16 that lead or merge with an outwardly extending annular O-ring positioning flange 18. The O-ring positioning flange 18 defines a pair of substantially flat annular stop surfaces 22, 24 and an annular concave O-ring seating surface 20 that extends therebetween. The annular body 12 also defines first and second annular face surfaces 28, 30 which respectively extend between the first and second beveled circumferential outer surfaces 14, 16 and the inner cylindrical surface 26.

Figure 3B:
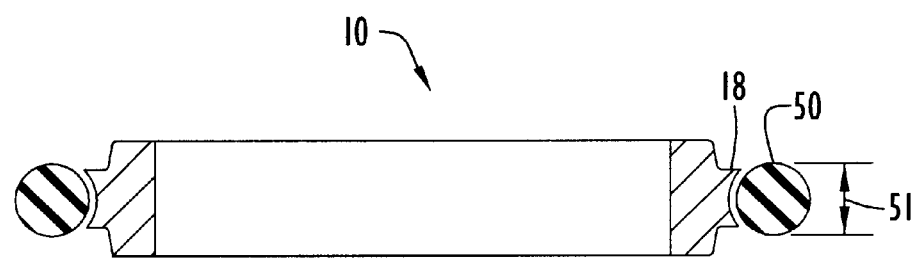
FIG. 3B illustrates the O-ring centering ring of FIG. 3A with an O-ring installed thereon.

The O-ring centering ring 10 is fabricated from any appropriate material for the intended gas exposure application, such as aluminum or stainless steel. The exemplary embodiment shown in FIGS. 1, 2, and 3A is a 40 millimeter size for NW-40 flanges. Accordingly, the centering ring 10 has an outer diameter 36 measured at the junction where the first or second beveled annular outer surfaces 14, 16 merge with the O-ring positioning flange 18 of approximately 1.614 inches. The O-ring positioning flange defines an outer diameter 34 of approximately 1.730 inches and the inner cylindrical surface 26 of the centering ring 10 defines an inner diameter 38 of approximately 1.370 inches. The centering ring 10 has a height or thickness 32 as measured between the first and second annular face surfaces 28, 30 of approximately 0.324 inches and each of the first and second annular face surfaces has a width 40 of approximately 0.108 inches. Each of the first and second beveled circumferential outer surfaces 14, 16 has a height 42 of approximately 0.085 inches and are inclined at an angle 44 of approximately 10 degrees as measured from a reference line 45 which is perpendicular to the annular stop surfaces 22, 24 of the O-ring positioning flange 18. The O-ring seat 20 has a width 46 of approximately 0.154 inches and a radius of approximately 0.104 inches. This allows the O-ring seat 20 to receive an elastomeric O-ring 50 having a diameter 51 of approximately 0.210 inches as shown in FIG. 3B. The O-ring 50 fitted to the centering ring 10 of the present invention can be made from silicone or any other suitable elastomeric material depending upon the working temperature, the gas used, and the vacuum of the system.

It should be understood, that the dimensions given above are for illustrative purposes only, and that O-ring centering ring of the present invention can be extended to all ISO-NW sizes by proportional sizing of the 40 millimeter design shown and described here.

Referring now to FIG. 4A, the O-ring centering ring 10 of the present invention is shown assembled between first and second vacuum tubing sections 52, 56 having respective first and second ISO-NW vacuum flanges 54, 58 which are compressed together by a clamping ring assembly 60 comprised of a split clamping ring 62 and a clamping ring thumb-screw fastener 64. The O-ring centering ring 10 positions and holds the O-ring 50 in place between respective sealing surfaces 66, 68 of the first and second ISO-NW vacuum flanges 54, 58. The vacuum tubing sections 52, 56 are shown fully assembled in FIG. 4B.

Figure 5A:
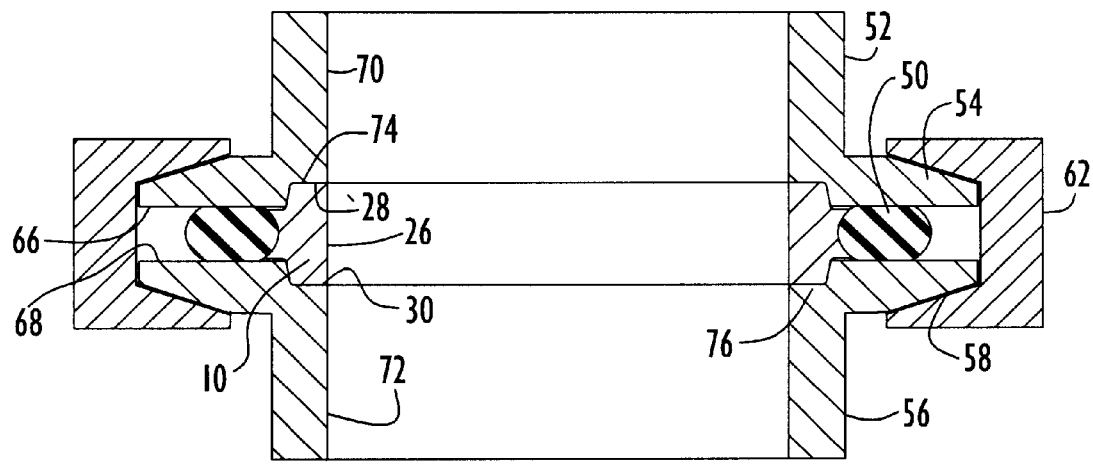
FIG. 5A is a cross-sectional side view through line 5A—5A of the vacuum tubing assembly of FIG. 4B.

Referring to FIG. 5A, a cross-sectional view through line 5A—5A of the fully assembled vacuum tubing sections 52, 56 of FIG. 4B is shown. As can be seen, the annular inner surface 26 of the centering ring 10 is constructed to be flush with the inner surfaces 70, 72 of the ISO-NW flanged tubing sections 52, 56 to provide a smooth bore transition across the connection. Accordingly, O-ring centering ring 10 of the present invention overcomes the problem of sudden expansion and/or sudden contraction effects that are common to gas piping systems that employ prior art centering rings at these connections.

Figure 5B:
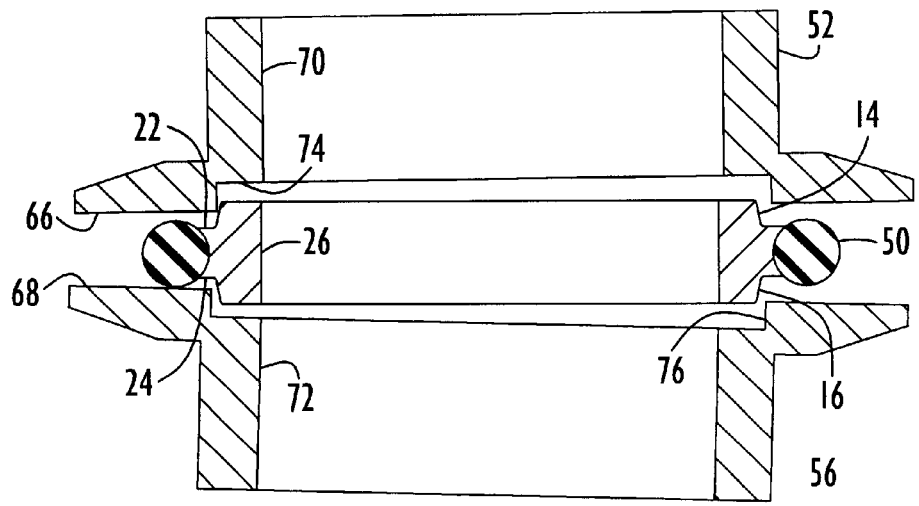
FIG. 5B illustrates the self-aligning aspect of the O-ring centering ring of the present invention as it applies to the components shown assembled in FIG. 5A.

Furthermore the first and second beveled circumferential outer surfaces 14, 16 substantially prevents the centering ring 10 from binding as it is inserted in counterbores 74, 76 defined in the ISO-NW flanges 54, 58. More specifically, the beveled annular outer surfaces 14, 16 provided on the centering ring 10 at the point of contact thereof to the counterbores 74, 76 operate to self align the centering ring 10 to a central position relative to the counter bores 74, 76 during assembly, even if the flanges 54, 58 are not aligned parallel initially as shown in FIG. 5B.

Each of the counterbores is comprised of a cylindrical counterbore surface which engages one of the beveled surface portions of the centering ring, and an annular counterbore with is perpendicular to the cylindrical counterbore surface, and which contacts one of the spaced apart annular surfaces of the centering ring.

Referring again to FIG. 5A, the annular stop surfaces 22, 24 of the O-ring flange 18 engage the sealing surfaces 66, 68 of the flanges 54, 58 to prevent the O-ring 50 from being overly compressed as it conforms to the sealing surfaces 66, 68 to provide a tight seal therebetween. As in prior art designs, the centering ring 10 of the present invention also functions to prevent the O-ring 50 from moving inward when gas pressure inside the tubing is lower than the gas pressure outside the tubing.

The O-ring centering ring 10 of the present invention can be used for all ISO-NW type vacuum flanged tubing or components without any modification to the flange. This includes any vacuum or gas flow systems which use the ISO-NW type of flange connections. Examples of such systems are, but not limited to semiconductor processing equipment, chemical etching systems, plasma or reactive ion etching systems, thin film chemical vapor deposition or epitaxy systems, and medium vacuum processing equipment.

It will be understood that the embodiment described herein is merely exemplary and that a person skilled in the art may make many variations and modifications to the described embodiment utilizing functionally equivalent elements to those described. Any variations or modifications to the invention described hereinabove are intended to be included within the scope of the invention as defined by the appended claims.

What is claimed:

1. The combination of a vacuum flange O-ring centering ring for holding a single elastomeric O-ring in position and a pair of vacuum sealing flanges having counterbores in which the centering ring is mounted, said centering ring comprising:

an annular body defining a circumferential outer surface, a cylindrical inner surface and a pair of spaced apart annular surfaces which extend between said circumferential outer surface and said inner cylindrical surface, and an annular flange having a peripheral groove, said flange disposed on said outer circumferential surface midway between the pair of spaced apart annular surfaces and extending outwardly therefrom, an elastomeric O-ring being positioned in said peripheral groove wherein said outer circumferential surface includes two beveled surface portions, each of which extends between said annular flange and one of said annular surfaces, said beveled surface portions being inserted in respective counterbores in said vacuum sealing flanges, wherein each counterbore is defined by a cylindrical counterbore surface and an annular counterbore surface perpendicular thereto, and each beveled surface portion contacts and is enclosed by said cylindrical counterbore surface.

2. The centering ring of claim 1 wherein each of said vacuum sealing flanges includes an annular flange surface perpendicular to said cylindrical counterbore surface for compressing the elastomeric O-ring.

3. The centering ring according to claim 2 wherein said annular flange has respective stop surfaces which form respective junctions with said beveled surface portions, for engaging said annular flange surfaces of said respective vacuum sealing flanges for preventing the elastomeric O-ring from becoming overly compressed.

4. The centering ring according to claim 3, wherein said beveled surface portions are inclined at an angle of approximately 10 degrees as measured from a reference line which is perpendicular to said stop surfaces.

5. The centering ring of claim 1 wherein each of the vacuum sealing flanges has an inner cylindrical surface dimensioned such that when the centering ring is mounted with the beveled surfaces against the respective cylindrical counterbore surfaces and the spaced a part annular surfaces against the annular counterbore surfaces, the inner cylindrical surfaces of the flanges are flush with the cylindrical inner surface of the centering ring.

* * * * *

UNITED STATES PATENT AND TRADEMARK OFFICE
CERTIFICATE OF CORRECTION

PATENT NO.   : 6,325,390 B1                                                Page 1 of 1
DATED        : December 4, 2001
INVENTOR(S)  : Roger Sillmon It is certified that error appears in the above-identified patent and that said Letters Patent is hereby corrected as shown below:

Drawings,
Sheet 4, replace Figure 5A with the Figure below:

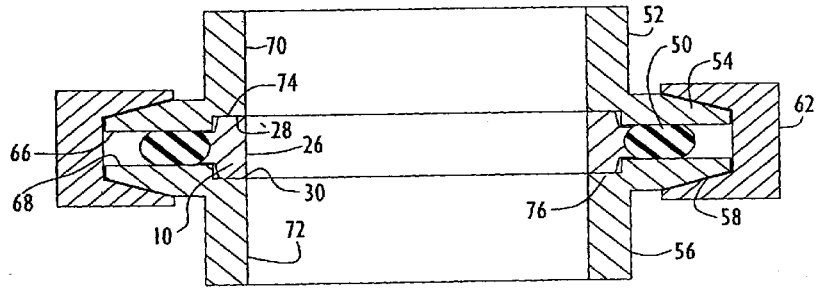

FIG.5A

Signed and Sealed this

Sixteenth Day of July, 2002

Attest:

JAMES E. ROGAN
Attesting Officer     Director of the United States Patent and Trademark Office